United States Patent [19]
Buxbaum

[11] Patent Number: 5,215,729
[45] Date of Patent: Jun. 1, 1993

[54] COMPOSITE METAL MEMBRANE FOR HYDROGEN EXTRACTION

[76] Inventor: Robert E. Buxbaum, 811 Oak St., East Lansing, Mich. 48823

[21] Appl. No.: 542,204

[22] Filed: Jun. 22, 1990

[51] Int. Cl.$^5$ .................. B01D 53/22; B01D 71/02; C01B 3/50
[52] U.S. Cl. ........................... 423/248; 55/16; 55/158; 423/648.1; 423/659
[58] Field of Search .......... 55/16, 158; 423/648.1, 423/659, 248

[56] References Cited

U.S. PATENT DOCUMENTS

| | | | |
|---|---|---|---|
| 3,148,031 | 9/1964 | Vahldieck et al. | 55/16 |
| 3,214,245 | 10/1965 | Peters | 55/158 |
| 3,344,582 | 10/1967 | Merrill et al. | 55/16 |
| 3,350,846 | 11/1967 | Makrides et al. | 55/16 |
| 3,407,571 | 10/1968 | Sherwood | 55/158 |
| 3,630,690 | 12/1971 | Coppola | 55/16 |
| 4,468,235 | 8/1984 | Hill | 55/16 |
| 4,494,965 | 1/1985 | Ali-Khan et al. | 55/16 |
| 4,944,777 | 7/1990 | Shmayda et al. | 55/16 |

FOREIGN PATENT DOCUMENTS

| | | | |
|---|---|---|---|
| 2133043 | 1/1973 | Fed. Rep. of Germany | 55/16 |
| 3434150 | 3/1986 | Fed. Rep. of Germany | 55/16 |
| 964532 | 7/1964 | United Kingdom | 55/16 |

*Primary Examiner*—Wayne Langel
*Attorney, Agent, or Firm*—Reising, Ethington, Barnard, Perry & Milton

[57] ABSTRACT

A membrane (14) for extracting hydrogen from fluid streams containing hydrogen consists essentially of a first layer (16) of a refractory metal or alloy which is permeable to hydrogen and has first and second surfaces (18,20). A second layer (22) is electroless or electrolytically deposited over the first surface (18) and attached thereto. A third layer (24) is similarly deposited over the other refractory surface (20), the second and third layers (22,24) consisting essentially of palladium, palladium alloys or platinum. A modification of this, for use in some applications, is the above membrane coated on only one surface with palladium, palladium alloys or platinum.

12 Claims, 1 Drawing Sheet

COMPOSITE METAL MEMBRANE FOR HYDROGEN EXTRACTION

TECHNICAL FIELD

The present invention relates to a membrane for the purification of hydrogen or its separation from a mixture. More particularly, the present invention relates to a composite metal membrane as well as its use and manufacture.

BACKGROUND OF THE INVENTION

Previously, a common technology for extracting pure hydrogen from industrial streams, such as for hydrogenation for changing the balance of hydrogen in those streams, or to increase reaction selectivity was to use membranes of palladium or palladium alloys often supported structurally by a porous ceramic matrix. A problem exists with this technology because palladium and its alloys are not strong and are very expensive. Accordingly, membranes which contain thick enough palladium layers to be made without holes and not break tend to be expensive and have relatively high resistance to hydrogen permeation. By contrast, refractory metals and alloys, especially those based on (Nb, V, Ta, Ti, Zr) have greater strength than Pd and Pd based alloys, they are also cheaper per unit volume and most have greater intrinsic permeabilities to hydrogen, but their surface properties are not good.

For example, the U.S. Pat. No. 1,292,025 to Darling discloses a membrane requiring porous or discontinuous palladium. The U.S. Pat. No. 4,496,373 to Bohr et al discloses alloying the palladium layer with silver, calcium, or yttrium. The patent also requires an intermediate melt layer. The U.S. Pat. No. 4,536,196 to Harris discloses essentially a palladium membrane which is coated with various metals as poisons to prevent the fouling of the palladium surface. Under some circumstances, this poisoning can be advantageous to the surface properties of the membrane, but the high cost and low reliability of palladium remains. The U.S. Pat. No. 4,313,013 to Harris shows similar palladium membranes that have been in use.

The U.S. Pat. No. 3,350,846 to Makrides et al discloses a process of purification of hydrogen by diffusion through a very thin membrane of palladium coated Group V-B metal. Aside from ignoring the more favorable metal alloys, the patent incorrectly identifies the source of permeation resistance intrinsic to the membrane, and thus derives the necessity of using membrane thicknesses from about 0.001 inch to 0.020 inch. The presumption is that these thicknesses are required to get reasonable rates of permeation. In part, this application is that this choice was based on an erroneous presumption that they were measuring the intrinsic permeability of the membrane and not a local, interface resistance localized at the Pd refractory interface. The deleterious interface resistance is a product of their method of membrane manufacture. The low limit on membrane thickness which they propose seems insufficient to withstand the most desirable applied pressures without rupture, and may preclude production of membrane without pin holes and voids in the membrane. Small diameter tubes or extra strength alloys would be a logical answer here but since this patent limits itself to pure metals which are sputter-coated, small diameter tubes coated on the inside and out would be very difficult to produce. The patent discloses membranes using Group V-B metals having a palladium layer on each side thereof. The palladium in this patent is applied to the Group V-B metal after an initial surface treatment consisting of the steps of etching electrolytically in hydrofluoric acid and washing with acetone. While the foil is still wet with acetone, it is placed in a vacuum chamber where it is dried by evacuation, after which palladium is sputtered onto both sides to form a very thin film which is free of voids, holes and pores. Presumably, these thin flat foil membranes would either have to be supported in a non-disclosed manner, or be used exclusively with a very low pressure difference between the source gas mix and the recovered $H_2$. A paper by Hsu and Buxbaum, J. Electrochem. Soc., 132:2419–2420 (1985) presents a coated Zr membrane for use in hydrogen extraction. Because of the choice of refractory materials (i.e. Zr), the membrane is only applicable for applications at extremely low $H_2$ pressures, the only practical example being the extraction of hydrogen isotopes from a liquid lithium stream in a nuclear reactor environment.

The present invention provides membranes which combine the best properties of palladium and of refractory metals; that is, good strength, good durability, low cost, and low resistance to hydrogen. Selectivity is essentially 100% hydrogen extracted.

SUMMARY OF THE INVENTION

In accordance with the present invention, there is provided a membrane for extracting hydrogen from fluid streams containing hydrogen. The membrane consists essentially of a structurally thick first layer of refractory metal or alloy permeable to hydrogen, the first layer having a first and second surface. A second layer coated over the first surface and attached to the first layer, the second layer consisting essentially of palladium, palladium alloys or platinum.

FIGURES IN THE DRAWINGS

Other advantages of the present invention will be readily appreciated as the same becomes better understood by reference to the following detailed description when considered in connection with the accompanying drawings wherein:

FIG. 1 is a schematic cross sectional view of an apparatus including a plurality of membranes constructed in accordance with the present invention; and FIG. 2 is a fragmentary cross sectional view of a tubular membrane constructed in accordance with the present invention.

DETAILED DESCRIPTION OF THE INVENTION

Figure 1:
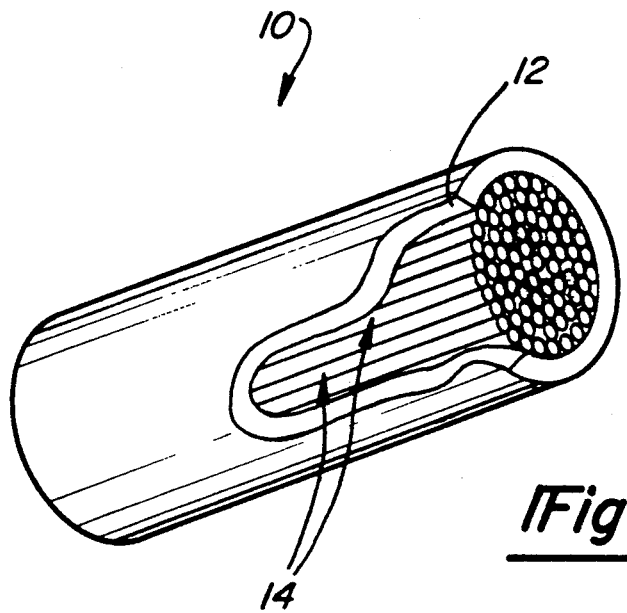
Figure 2:
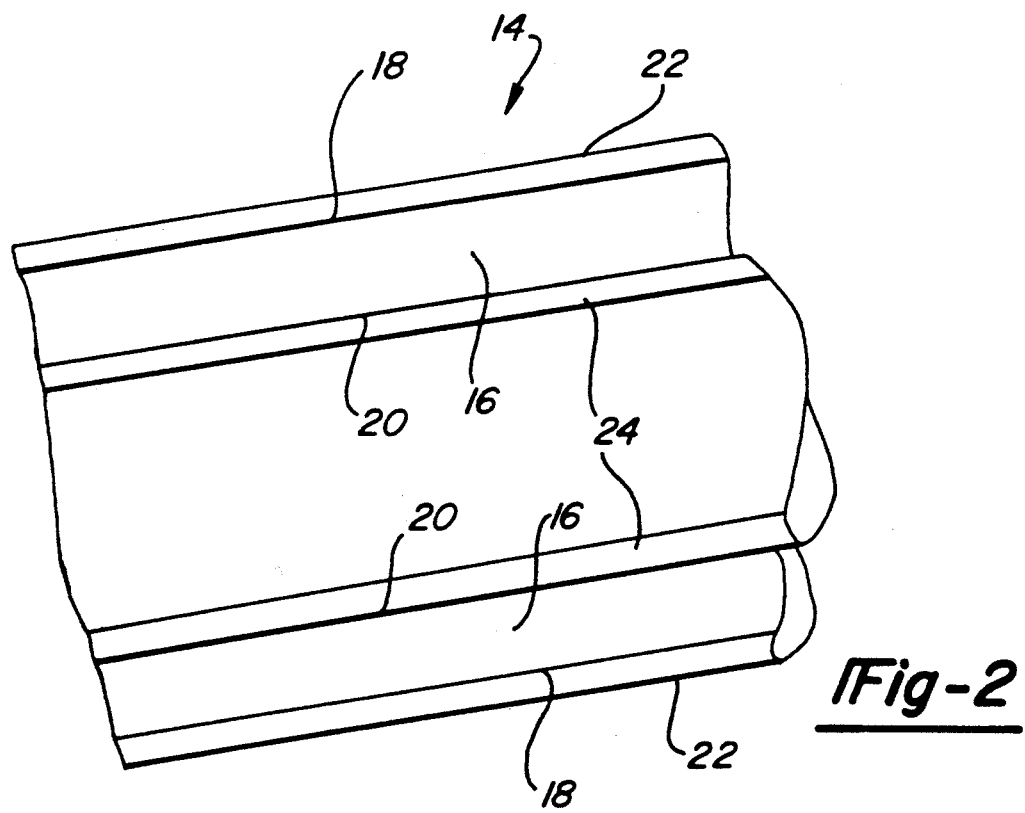

An apparatus for extracting hydrogen from fluid streams containing hydrogen is generally shown at 10 in FIG. 1. The Figure schematically shows an outer shell 12 containing a plurality of membranes generally indicated at 14. The membranes 14 are in the form of tubes. A portion of a tube is shown in cross section in FIG. 2. The tubes are held within the shell attachment to a header sheet 13. The means of attachment of tubes to header sheet 13 and of header sheet to shell is well known by those versed in the art of heat exchanger design.

The membrane 14 is capable of extracting hydrogen from a fluid stream containing hydrogen. The membrane 14 generally includes a first layer 16 of refractory metal or alloy which is permeable to hydrogen, the first layer 16 having a first outer surface 18 and an inner surface 20.

Examples of refractory metals are vanadium tantalum, zirconium, niobium, and their stronger, or non-hydrogen embrittling alloys. Alloys include: Nb 1% Zr, Nb 10Hf 1Ti, Vanstar TM, and V15Cr 5Ti.

The metals of the first layer 16 are chosen for high hydrogen permeability in combination with strength and good swelling characteristics in the presence of hydrogen. The refractory membranes would be permeable to hydrogen except that: (a) the surfaces of these substances are generally poor at dissociating and reassociating molecular hydrogen; and (b) they tend to form oxide and other permeation barriers at their surfaces which greatly limits their utility.

In accordance with the present invention, a second layer 22 is coated preferably by a wet chemical method (electrolytic or electroless plating) over the first surface 18 and attached to the first layer 16, the second layer consisting essentially of palladium, palladium alloys, or platinum. For example, via a suitable method disclosed in Hsu and Buxbaum, J. Electrochem. Soc., 132:2419-2420 (1985). Examples of palladium alloys are palladium-silver and palladium-gold. These metals are capable of dissociating hydrogen gas into molecular hydrogen, the molecular hydrogen then permeating through the first layer 16. An inner third layer 24 consisting essentially of palladium, palladium alloys, or platinum is coated over the inner surface 20 of the membrane. This inner layer reassociates the hydrogen or alternatively catalyzes a hydrogen oxidation reaction, e.g. reacting the hydrogen with oxygen gas to form water. In either case this coating thereby promotes permeation through the membrane. That is, the second layer 22 dissociates hydrogen molecules in a fluid mixture into dissociated hydrogen molecules or H-atoms. The hydrogen easily permeates this thin layer 22. The hydrogen is drawn through the membrane 16 following the path of lower free energy. The permeating hydrogen reassociates into $H_2$ molecules or is oxidized (e.g. to water) on the surface of layer 24. The associated molecules then enter the tube and are carried off. Alternatively, the direction of hydrogen permeation can be run from inside-out, as opposed to outside-in. That is to say, for example, that hydrogen molecules can diffuse through a membrane tube entering at the inside surface and can be removed at the outside surface. This second geometry may be more appropriate for hydrogen extraction from cat-cracking and hydrodesulfurization streams.

Unlike prior art hydrogen permeating membranes, the refractory metal surfaces of the present invention do not have oxide or other interventions in-between the various layers or on the outer surface thereof. Such oxidized surfaces inhibit permeation and decrease efficiency of the membrane. To counteract this problem, prior art membrane constructs were very thin but were very fragile. In accordance with the present invention, a thicker membrane can be made which is stronger yet has excellent hydrogen permeation characteristics. One advance proposed is a heat treatment of the fabricated membrane, a fabrication method which is found to drive much of the surface oxide (a permeating barrier) into the bulk refractory metal and also anneals the coated layers onto the refractory layer. Other differences include the coating method; a wet chemical vs sputtered and the choice of alloys over pure metals.

The layers 22 and 24 are uniform, continuous coatings. The tubular members are annealed and thereby improve the binding of layers 22,24 to the first layer 16. The annealing also reduces surface resistance.

The membranes have a thickness of between $2.2 \times 10^{-8}$ to $1.5 \times 10^{-4}$ m, the thickness being chosen based on the expected temperature of operation. A suggestion of the Pd layer thicknesses for Pd on membranes of various materials is listed below along with predicted values of the inner metallic diffusivities as functions of the use temperatures, Table I.

| | Intermetallic diffusivities and projected intermetallic thickness for Zr—Pd, Nb—Pd, V—Pd, Ni—Pd and SS—Pd for 30 years operation | | | | | |
|---|---|---|---|---|---|---|
| | | Thickness (m) | | | | |
| Metal | $D(m^2/s)$ | 400° C. | 450° C. | 500° C. | 550° C. | 600° C. |
| Zr—Pd | $7.2 \times 10^{-4} \exp(-5100/RT)$[1] | $1.5 \times 10^{-7}$ | $5.6 \times 10^{-6}$ | $1.3 \times 10^{-5}$ | $4.9 \times 10^{-5}$ | $1.2 \times 10^{-4}$ |
| Nb—Pd | $1.2 \times 10^{-3} \exp(-67380/RT)$ | $2.2 \times 10^{-8}$ | $1.3 \times 10^{-7}$ | $5.7 \times 10^{-7}$ | $2.0 \times 10^{-6}$ | $7.0 \times 10^{-6}$ |
| V—Pd | $7.2 \times 10^{-4} \exp(-63094/RT)$ | $7.8 \times 10^{-8}$ | $4.0 \times 10^{-7}$ | $1.6 \times 10^{-6}$ | $5.7 \times 10^{-6}$ | $1.7 \times 10^{-5}$ |

[1]Where R equals 1.987 cal/g-atom K.

Typically, the thickness of the second and third layers 22,24 are 0.02 to 20 microns; for design of membranes based on most of the alloys above, the palladium thickness would be about that for palladium on a membrane the major component metal. For example, for Pd on Nb-1% Zr, the Pd cost thickness is predicted to be about that predicted (Table 1) for Nb-Pd at that operating temperature.

The layers 22,24 perform two functions. First, as stated above, the palladium, or less likely the platinum, are good dissociation catalysts of hydrogen gas or hydrogen rich molecules to atomic hydrogen. The atomic hydrogen then diffuses through the first layers 16, 22 and 24. The layers 22,24 further protect the base metal from poisons such as carbon, oxygen, nitrogen, and sulfur. Thusly, the layers 22,24 can be said to react with the first layer 16 to make the surface thereof permeable. Thusly, the present invention provides membranes having a first layer 16 with sufficient strength for the membranes to be made at a desired thinness but further having sufficient hydrogen permeability such that the membranes can be made at a thickness capable of withstanding commercially applied pressures.

There are various uses for the membranes 14 constructed in accordance with the present invention. For example, the membranes can be used as a hydrogen extractor for removing hydrogen from refinery gas streams such as cat-cracker off gas, hydrodesulfurization gas or process gas mixes of carbon monoxide, hydrogen water and carbon dioxide. Utilizing membranes constructed in accordance with the present invention, hydrogen can be derived from these process gas mixes for other processes and/or to correct the hydrogen carbon monoxide mole ratio before feeding into, for example, an alcohol production reactor.

As a hydrogen extractor, the present invention can be used for removing hydrogen from mixtures of alkanes and alkenes, so as to favor alkene production. For example, this process can be used in the production of butene from butane; hydrogen gas would be extracted at intermediate stages in a furnace - reactor- furnace- reactor etc. train, the hydrogen being available for use elsewhere.

The membrane can also be used as a hydrogen extractor for the removal of radioactive hydrogen isotopes from nuclear reactor streams. For this use, it may be advisable to employ a membrane that is coated with palladium on only a single side. This is because many nuclear reactor streams (e.g. liquid metals) which dissociate hydrogen and absorb impurities on their own, are reactive to palladium.

As a membrane reactor, the present invention can be used for removing hydrogen during the production of alkenes from alkanes. For example, the present invention can be used for making butene from butane by shifting the equilibrium within the reaction chamber. This case would be like the reactor furnace extractor train mentioned previously, but condensed into a single process membrane reactor. The effects of entothermisity can be aided by adding a diluent to the hydrogen extraction side or by the addition of oxygen on this side away from the reaction area. The use of the hydrogen is lost thereby, but the alkene formation reaction (generally an endothermic reaction) would be heated in situ by the hydrogen oxidation and accordingly, hydrogen pumping and furnace costs would be minimized.

Also as a membrane reactor, the present invention can be used as a hydrogenation reaction where hydrogen is extracted from a fluid stream and used to hydrogenate a product. Hydrogenation of a stream containing butadiene and butyne has some commercial potential. The butyne would be preferentially hydrogenated allowing it to be economically extracted as butene and recycled.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A membrane (14) for extracting hydrogen from fluid streams containing hydrogen, said membrane consisting essentially of: a first nonporous layer (16) of refractory metal or nontitanium alloy of refractory metal being permeable to hydrogen and having a first and second surface (18,20); and a second nonporous layer (22) coated directly over said first surface (18) and having no oxide therebetween and attached to said first layer (16), said second layer (22) consisting essentially of palladium, palladium alloys, platinum or platinum alloys.

2. A membrane as set forth in claim 1 wherein said second layer is a uniform continuous coating.

3. A membrane as set forth in claim 2 wherein said membrane is annealed for improving bonding of said first and second layer (16,22) and for reducing surface resistance.

4. A membrane as set forth in claim 3 wherein said membrane (14) is a tubular member.

5. A membrane as set forth in claim 1 including a third layer (24) coated over said second surface (20) and attached to said first layer (16), said third layer (24) consisting essentially of palladium, palladium alloys, or platinum.

6. A membrane as set forth in claim 5 wherein said membrane (14) has a thickness of between $1 \times 10^{-5}$ to $1 \times 10^{-2}$ m, said thickness being temperature and pressure dependent.

7. A membrane as set forth in claim 6 wherein said second and third layers (22,24) are about 0.02 to 20 um thick.

8. A method of extracting hydrogen from a stream containing hydrogen, said method including the steps of: dissociating hydrogen gas or hydrogen rich molecules into atomic hydrogen on and through a second layer of nonporous membrane consisting of palladium, palladium alloy or platinum, extracting the dissociated hydrogen from the second layer into and through a first nonporous layer of refractory metal or nontitanium alloy of a refractory metal, there being no oxide between said first and second layers; and protecting the first layer from chemical poisons while promoting permeation through the first layer.

9. A method as set forth in claim 8 further including the step of reassociating the hydrogen leaving the second layer through a third layer of palladium, palladium alloy or platinum.

10. A method as set forth in claim 8 further including the step of reacting the hydrogen leaving the second membrane with oxygen or a hydrogen-poor molecule.

11. A method as set forth in claim 8 wherein said method utilizes the membrane as a membrane reactor shifting the chemical equilibrium of a catalyzed or uncatalyzed reaction involving hydrogen within a reactor chamber.

12. A method as set forth in claim 11 wherein the reaction is a catalyzed reaction, the catalyst being distinct from the membrane coat.

* * * * *